(12) United States Patent
Mogi et al.

(10) Patent No.: US 12,097,904 B2
(45) Date of Patent: Sep. 24, 2024

(54) FRONT STRUCTURE OF VEHICLE

(71) Applicant: Mazda Motor Corporation, Hiroshima (JP)

(72) Inventors: Hosei Mogi, Hiroshima (JP); Kenji Fujita, Hiroshima (JP); Etsuji Saiki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 261 days.

(21) Appl. No.: 17/884,591

(22) Filed: Aug. 10, 2022

(65) Prior Publication Data

US 2023/0058886 A1 Feb. 23, 2023

(30) Foreign Application Priority Data

Aug. 23, 2021 (JP) ................................ 2021-135840

(51) Int. Cl.
*B62D 25/08* (2006.01)
*B62D 25/14* (2006.01)
*B62D 29/00* (2006.01)
*B60R 21/34* (2011.01)

(52) U.S. Cl.
CPC ......... *B62D 25/081* (2013.01); *B62D 25/142* (2013.01); *B62D 29/001* (2013.01); *B60R 21/34* (2013.01); *B60R 2021/343* (2013.01)

(58) Field of Classification Search
CPC .. B62D 25/081; B62D 25/142; B62D 29/001; B60R 21/34; B60R 2021/343
USPC .......................................................... 296/192
See application file for complete search history.

(56) References Cited

U.S. PATENT DOCUMENTS

| | | | | |
|---|---|---|---|---|
| 7,976,097 B2* | 7/2011 | Watanabe | ................ | B60H 1/28 296/192 |
| 2015/0028629 A1* | 1/2015 | Sasaki | .................. | B62D 25/082 296/192 |
| 2016/0339962 A1 | 11/2016 | Yamamoto | | |

FOREIGN PATENT DOCUMENTS

JP 2016-215755 A 12/2016

* cited by examiner

*Primary Examiner* — Amy R Weisberg
*Assistant Examiner* — Dana D Ivey
(74) *Attorney, Agent, or Firm* — XSENSUS LLP

(57) ABSTRACT

A gutter member has a flow path portion that receives the water dripping from a front windshield and flows the received water in the vehicle width direction and a drain portion that drains the water to a drain member on the inner side in the vehicle width direction of the flow path portion, in which at least a part of the flow path portion overlaps with the drain path in vehicle plan view, the gutter member has guide portions that guide the water dripping from the drain portion to the drain path, and the guide portions, include a cushioning material that absorbs an impact load at least in the vertical direction.

9 Claims, 7 Drawing Sheets

FRONT STRUCTURE OF VEHICLE

CROSS-REFERENCE TO RELATED APPLICATION

The present application claims priority to Japanese Patent Application 2021-135840, filed Aug. 23, 2021, the entire contents of which are incorporated herein by reference.

BACKGROUND

Field

The present disclosure relates to a front structure of a vehicle and, more particularly, to a front structure of a vehicle including a drain member having a drain path for drainage to an outer side in a vehicle width direction below a front windshield and a gutter member above the drain member and below the front windshield.

Description of the Related Art

There is a conventionally known structure that is provided with a cowl center as a gutter member that prevents the water dripping from a front windshield from entering the air inlet of a dash lower panel, and drains the water having dripped onto a drain member disposed below the cowl center to the outer side in the vehicle width direction (see patent document 1).

The cowl center as the gutter member described above basically flows water drops to the outer side in the vehicle width direction, but when the vehicle is inclined, for example, when the vehicle rides on a curb, the cowl center flows water droplets to the middle side in the vehicle width direction.

When the width in the vehicle front-rear direction of the drain path of the drain member below the gutter member is small, if water is drained to the drain path from the end portion on the inner side in the vehicle width direction of the flow path portion of the gutter member, the water may enter a portion other than the drain path.

In order to solve such a problem, a structure in which a guide portion for inducing water drops dripping from the flow path portion to the drain path is considered. In this case, however, there is a concern that a vertical wall forming the front end portion of the drain path makes contact with the guide portion at the time of collision between own vehicle and a pedestrian and the input load to a collision object increases.

PRIOR ART DOCUMENTS

Patent Documents

[Patent document 1] JP-A-2016-215755

SUMMARY

Technical Problems

An object of the present disclosure is to provide the front structure of a vehicle that suppresses entry of water to other than the drain path of the drain member and suppresses adverse effects on collision performance caused by a strut behavior due to contact between the drain member and the gutter member at the time of vehicle collision.

Means for Solving the Problems

The present disclosure is a front structure of a vehicle, including: a drain member having a drain path for drainage to an outer side in a vehicle width direction below a front windshield; and a gutter member located above the drain member and below the front windshield, in which the gutter member has a flow path portion that receives water dripping from the front windshield and flows the received water in the vehicle width direction, and a drain portion that drains the water to the drain member on an inner side in the vehicle width direction of the flow path portion, at least a part of the flow path portion overlapping with the drain path in vehicle plan view, and the gutter member has a guide portion that guides the water dripping from the drain portion to the drain path and the guide portion includes a cushioning material that absorbs an impact load at least in a vertical direction.

According to the present disclosure, entry of water to a portion other than the drain path can be suppressed and, even if the cushioning material comes into contact with the drain member when the vehicle collides with a pedestrian, the collision load to be input to the collision object can be reduced by absorbing the collision load because the guide portion includes the cushioning material.

In short, it is possible to suppress entry of water to a portion other than the drain path of the drain member while suppressing a strut behavior between the drain member and the gutter member at the time of vehicle collision.

In an aspect of the present disclosure, the flow path portion may have a cross section with a substantially U-shaped cross section in vehicle side view and have a hole as the drain portion behind the flow path portion, and the guide portion may have a hole side guide portion that is inclined downward toward a vehicle rear from a lower end of the hole.

According to the present disclosure, since the hole side guide portion is provided, impacts in the vertical direction can be absorbed because the hole side guide portion includes the cushioning material while drainage from the hole to the drain path is ensured.

In addition, in an aspect of the present disclosure, a lower end portion of the hole side guide portion may overlap with the drain path in vehicle plan view.

According to the present disclosure, since the lower end portion of the hole side guide portion overlaps with the drain path, the water once contained in the hole side guide portion or the water dripping while being attached to the hole side guide portion reliably drips from the lower end portion of the hole side guide portion to the drain path, thereby suppressing entry of water to a portion other than the drain path more reliably.

In addition, in an aspect of the present disclosure, an air inlet that takes in air for air conditioning may be opened and formed on one end side in the vehicle width direction of a dash panel, and the guide portion may include an air inlet side guide portion provided along the substantially U-shape at a position below the flow path portion, the position being closer to the air inlet in the vehicle width direction than the hole.

According to the present disclosure, when the water drops having dripped from the hole are sucked by wind from the air inlet and flow in the vehicle width direction while containing droplets, the wind containing droplets strikes the wall surface in the vehicle width direction of the air inlet side guide portion and accurately drips onto the drain path along the air inlet side guide portion. As described above, the droplets sucked from the hole to the air inlet can be guided to the drain path.

In addition, in an aspect of the present disclosure, the cushioning material may include a foam resin material.

According to the present disclosure, the cushioning material can be formed by using a simple structure.

In addition, an aspect of the present disclosure may further include a vertical wall portion that constitutes a front end portion or a rear end portion of the drain path and extends in the vertical direction, in which the vertical wall portion may overlap with the flow path portion in vehicle plan view.

According to the present disclosure, an appropriate drain path can be formed by the vertical wall portion and this vertical wall portion extends in the vertical direction and comes close to the flow path portion. However, since the guide portion includes the cushioning material, even if the vertical wall portion comes into contact with the flow path portion via the guide portion at the time of collision, the collision load to be input to the collision object can be reduced by absorbing the collision load.

ADVANTAGES

The present disclosure has the effect of suppressing entry of water to other than the drain path of the drain member and suppressing adverse effects on collision performance caused by a strut behavior due to contact between the drain member and a gutter member at the time of vehicle collision.

DESCRIPTION OF EMBODIMENTS

An object of suppressing entry of water to other than the drain path of a drain member and suppressing adverse effects on collision performance caused by a strut behavior due to contact between the drain member and a gutter member at the time of vehicle collision is achieved by a structure including a drain member having a drain path for drainage to an outer side in a vehicle width direction below a front windshield; and a gutter member located above the drain member and below the front windshield, in which the gutter member has a flow path portion that receives water dripping from the front windshield and flows the received water in the vehicle width direction and a drain portion that drains the water to the drain member on an inner side in the vehicle width direction of the flow path portion, at least a part of the flow path portion overlapping with the drain path in vehicle plan view, and the gutter member has a guide portion that guides the water dripping from the drain portion to the drain path and the guide portion includes a cushioning material that absorbs an impact load at least in a vertical direction.

EMBODIMENT

A non-limiting embodiment of the present disclosure will be described in detail below with reference to the drawings.

Figure 1:
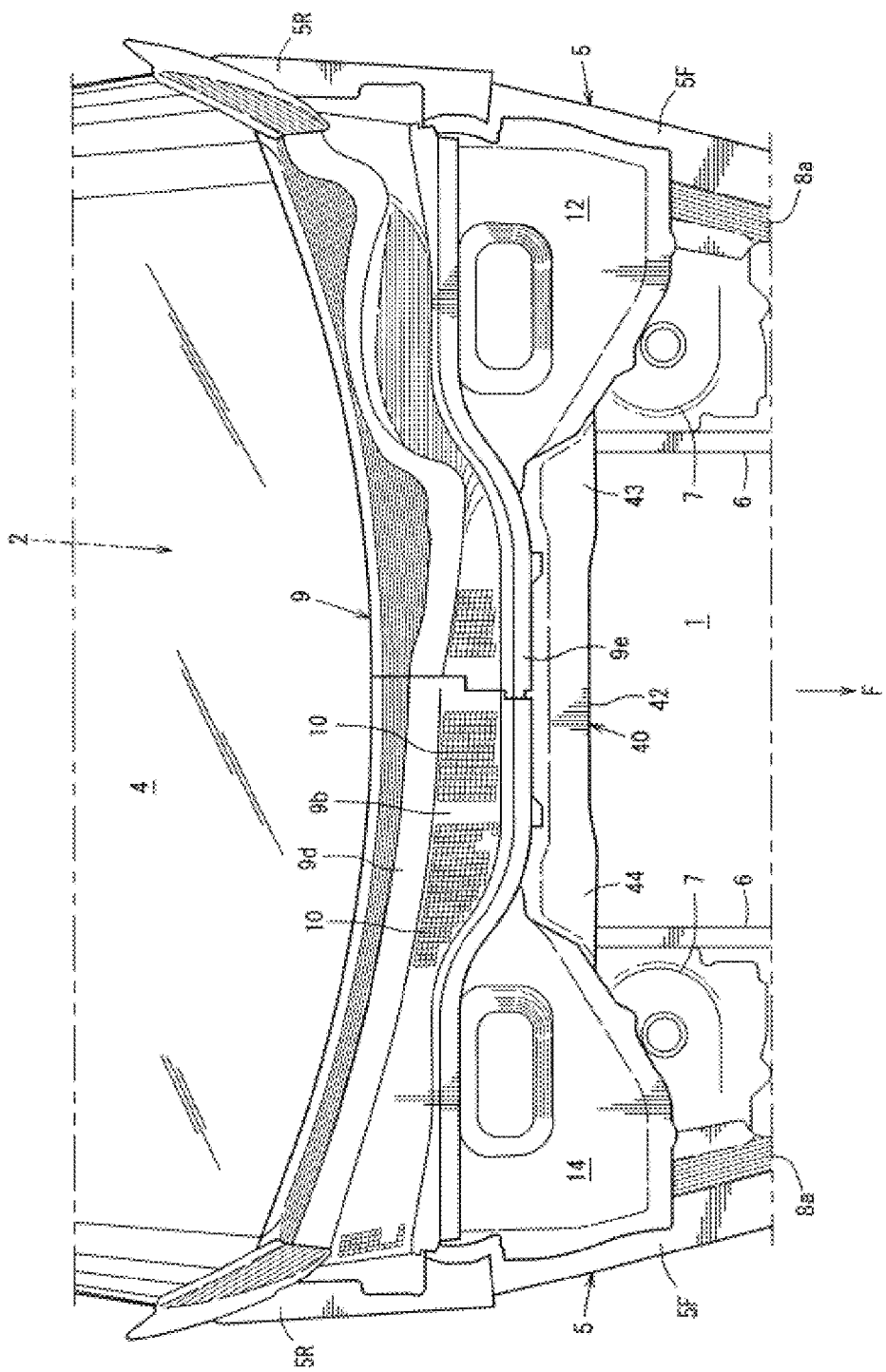
FIG. 1 is a plan view illustrating a front structure of a vehicle.

The drawings illustrate the front structure of a vehicle. FIG. 1 is a plan view illustrating the front structure of the vehicle, FIG. 2 is plan view illustrating the state in which a cowl grille has been removed from the state in FIG. 1, FIG. 3 is a perspective view of the vehicle right side in FIG. 2, and FIG. 4 is a front perspective view illustrating the front structure of a vehicle as seen from upper front of the vehicle.

Figure 2:
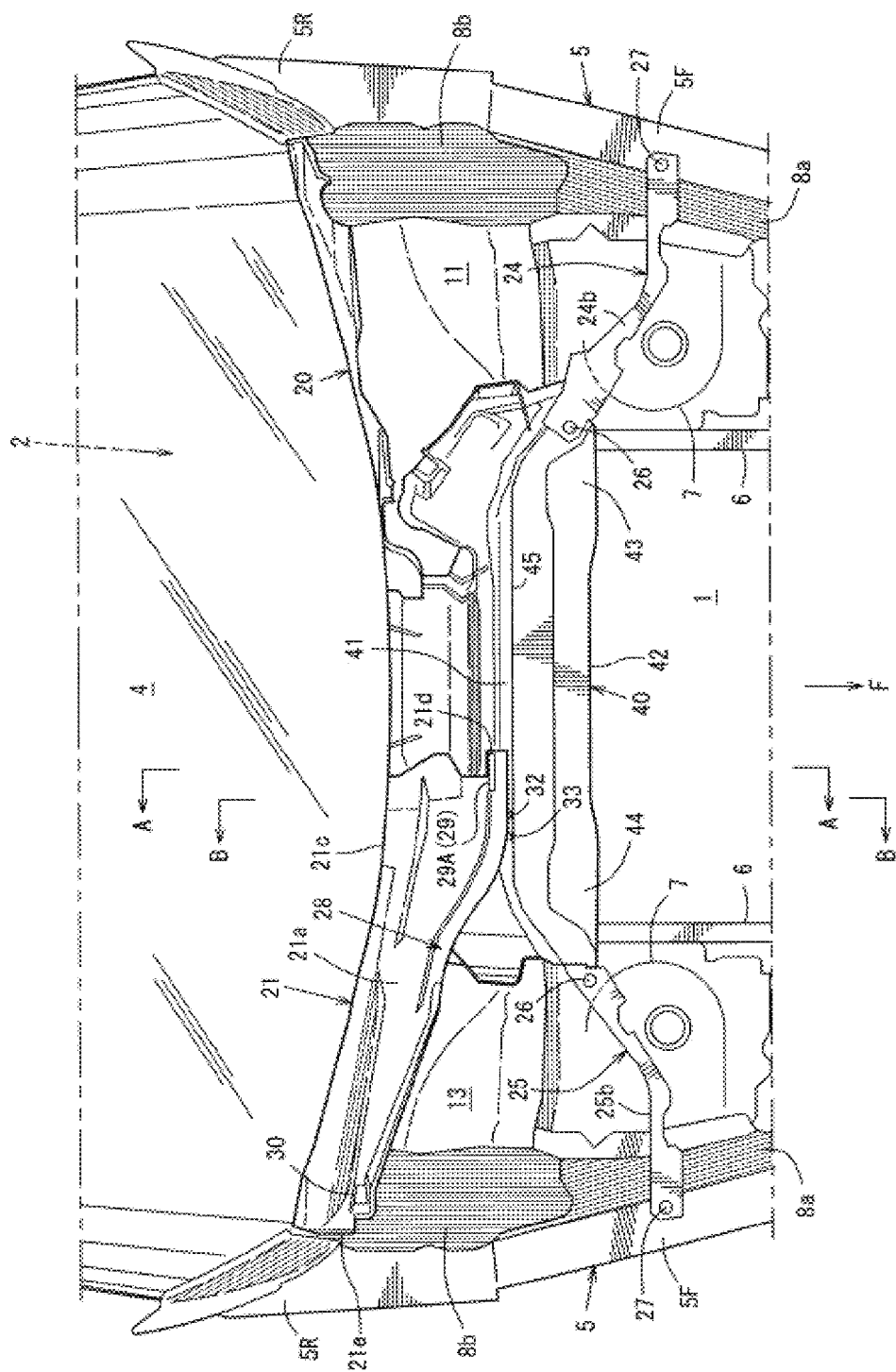
FIG. 2 is plan view illustrating the state in which a cowl grille has been removed from the state in FIG. 1.
Figure 5:
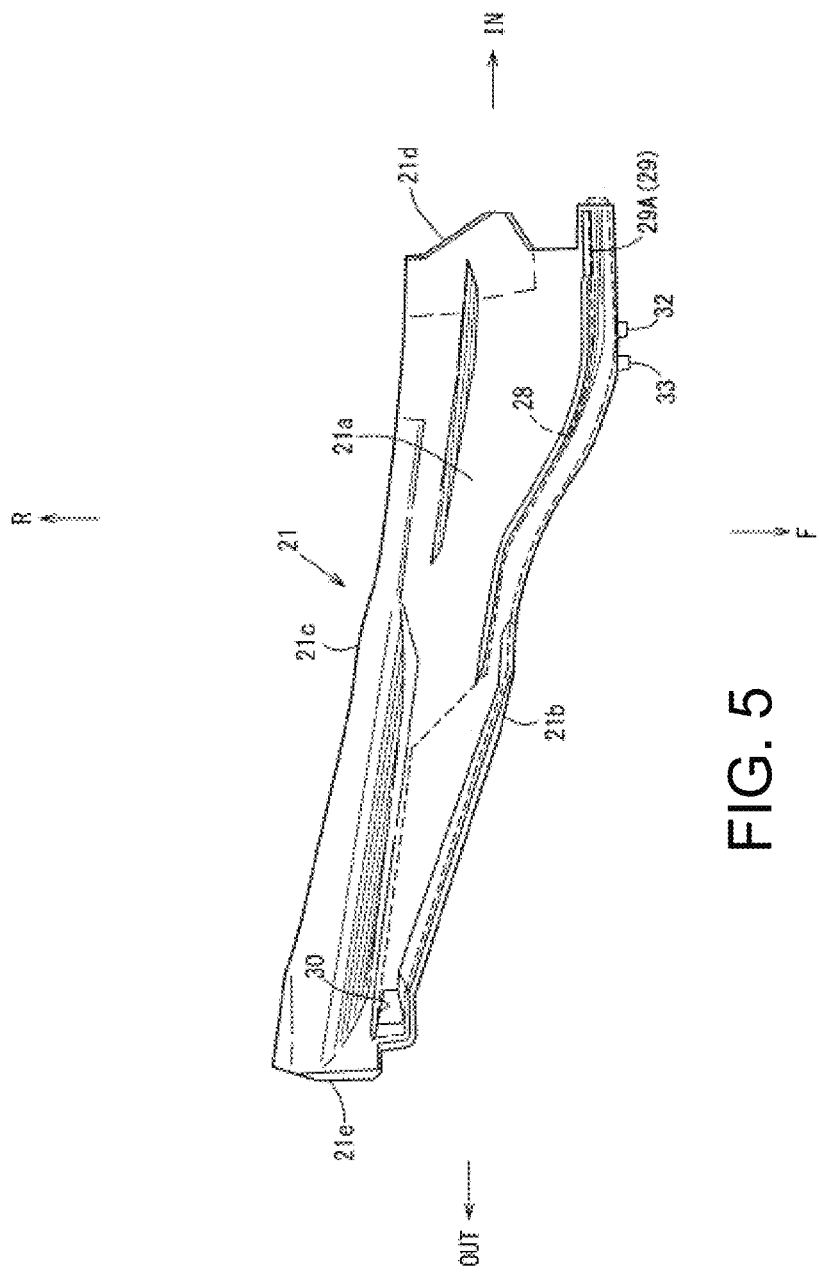
FIG. 5 is a plan view illustrating a flow path portion of a gutter member.
Figure 6:
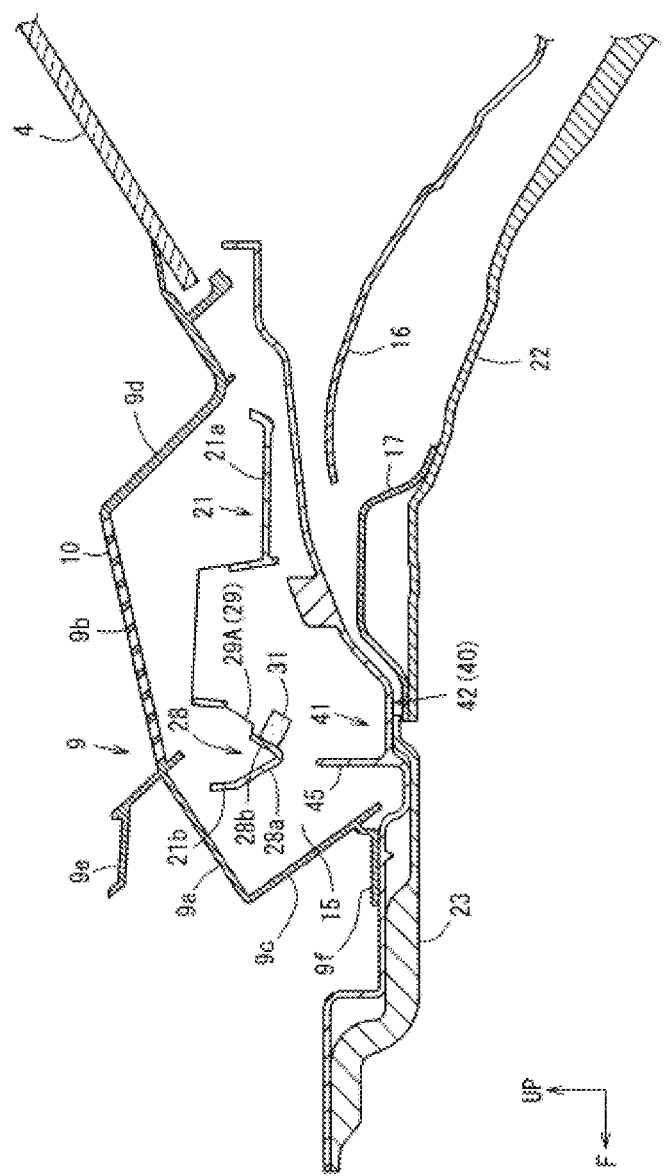
FIG. 6 is a sectional view seen along arrow A-A in FIG. 2.
Figure 7:
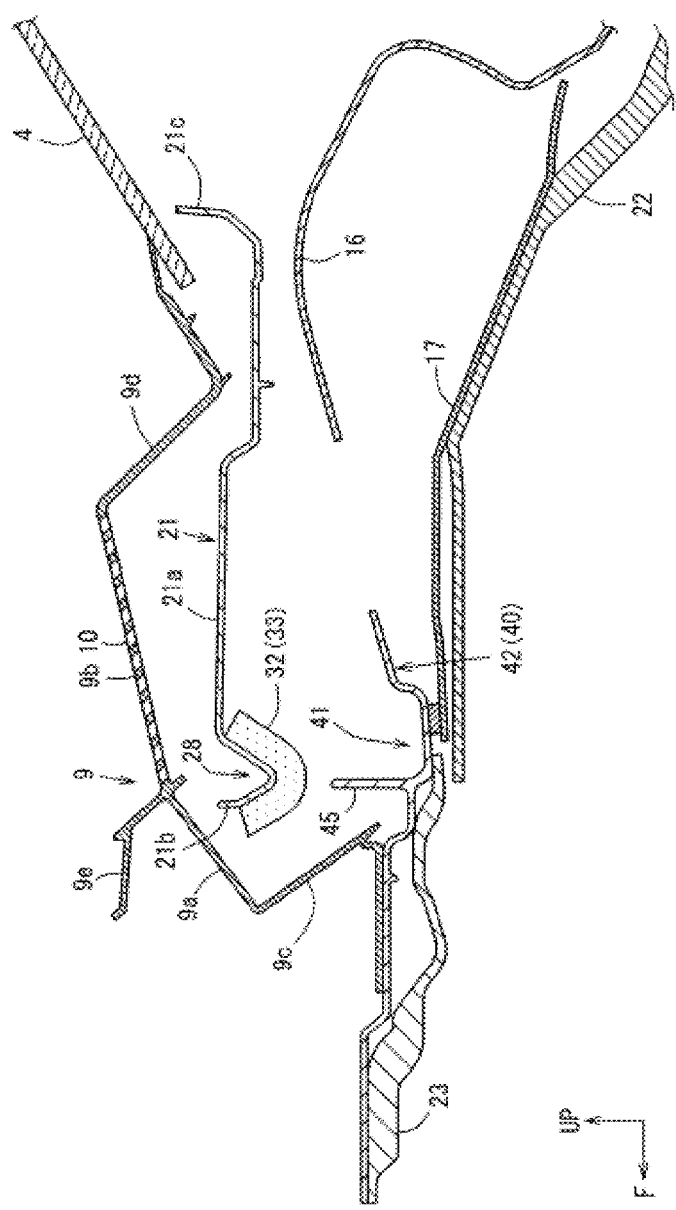
FIG. 7 is a sectional view seen along arrow B-B in FIG. 2.

In addition, FIG. 5 is a plan view illustrating a flow path portion of a gutter member, which is a so-called a cowl center, FIG. 6 is a sectional view seen along arrow A-A in FIG. 2, and FIG. 7 is a sectional view seen along arrow B-B in FIG. 2.

Before the front structure of a vehicle is described, a front body structure will be first described.

Figure 3:
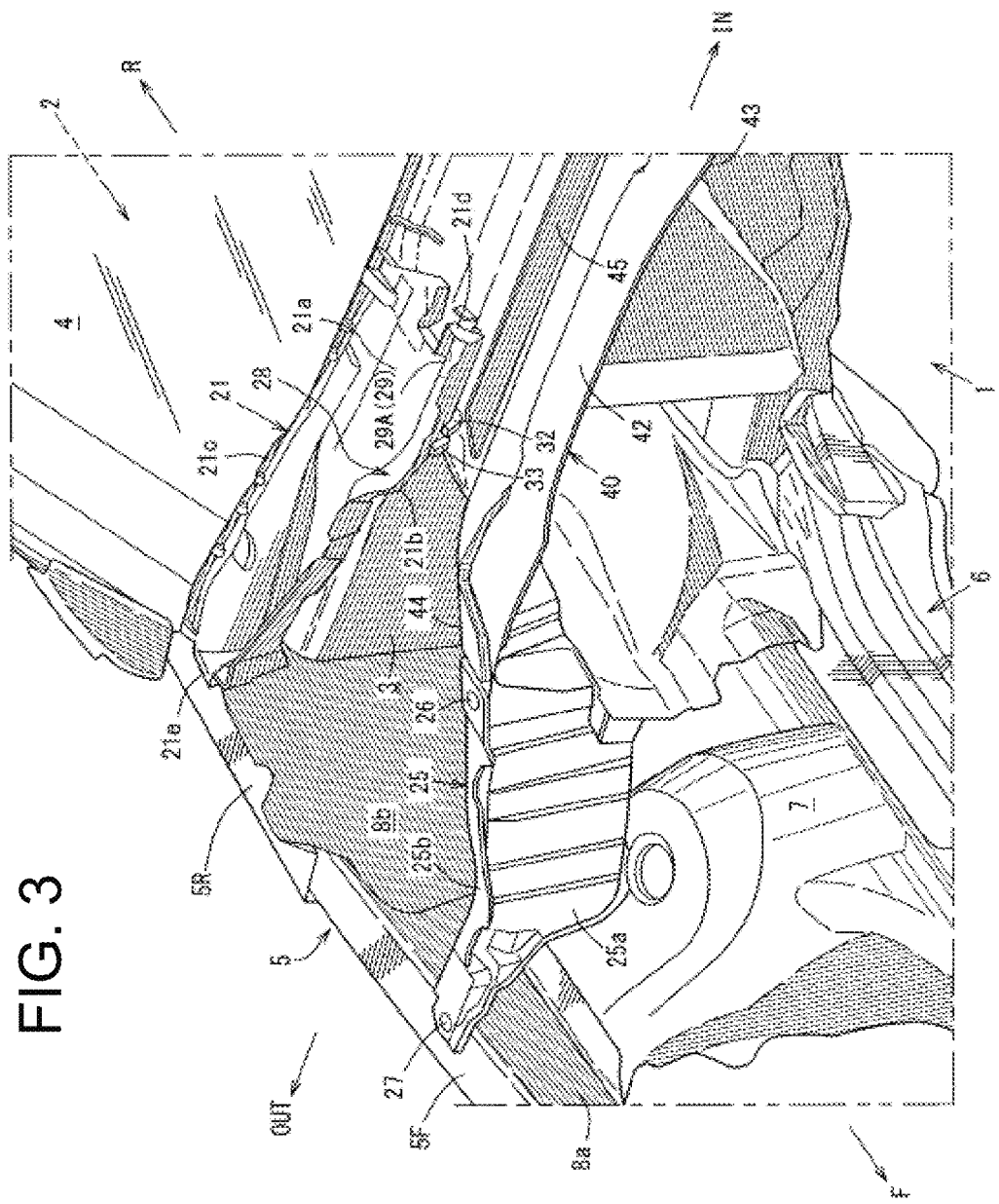
FIG. 3 is a perspective view of the vehicle right side in FIG. 2.
Figure 4:
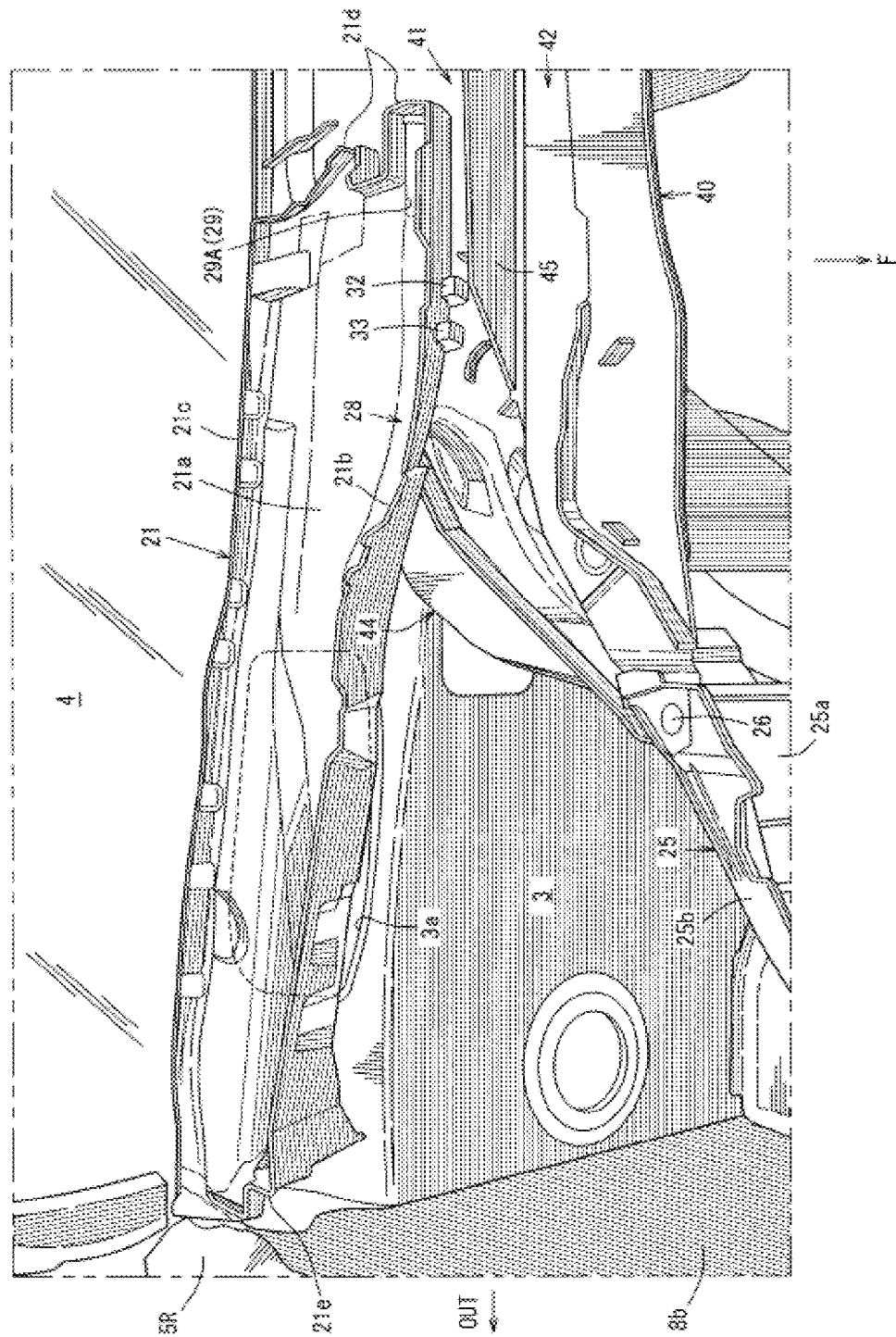
FIG. 4 is a front perspective view illustrating the front structure of a vehicle.

The front body structure is provided with a dash lower panel 3 illustrated in FIGS. 1 to 3 as a dash panel that separates an engine compartment 1 from a vehicle interior 2 in the vehicle front-rear direction (see FIG. 4). This dash lower panel 3 extends in the vehicle width direction as illustrated in FIG. 4 and the left and right end portions in the vehicle width direction of the dash lower panel 3 are coupled to hinge pillars.

The hinge pillars described above are erected so as to extend in the vehicle vertical direction. Each of the hinge pillars is the vehicle body strengthening member that joins and fixes a hinge pillar inner and a hinge pillar outer to each other and has a hinge pillar closed cross-section extending in the vehicle vertical direction.

The lower end portion of the hinge pillar described above is provided with a side sill extending from the lower end portion to the vehicle rear. This side sill is the vehicle body strengthening member that joins and fixes a side sill inner and a side sill outer to each other and has a side sill closed cross-section extending in the vehicle front-rear direction.

In addition, the upper end portion of the hinge pillar described above is provided with a front pillar extending backward and diagonally upward from the upper end portion. This front pillar is the vehicle body strengthening member that joins and fixes a front pillar inner and a front pillar outer to each other and has a front pillar closed cross-section extending diagonally rear upward of the vehicle.

As illustrated in FIGS. 1 to 4, a front windshield 4 (so-called front window glass) is provided in the opening for disposition of the front windshield surrounded and formed by a pair of left and right front pillars, a front header disposed on the front side of the upper portion of the vehicle, and a cowl panel.

Here, the dash lower panel 3 described above is the panel member that is located in the lower end portion of the front windshield 4 and separates the engine compartment 1 from the vehicle interior 2 in the vehicle front-rear direction while extending in the vehicle width direction, as illustrated in FIG. 4.

On the other hand, as illustrated in FIGS. 1 to 3, a pair of left and right apron reinforcements 5 extending to the vehicle front from the front portions of the upper ends of the left and right hinge pillars described above are provided in front portions of the upper ends.

The apron reinforcement 5 described above includes an apron reinforcement front 5F and an apron reinforcement rear 5R.

As illustrated in FIGS. 1 to 3, there is provided a pair of left and right front side frames 6 extending to the vehicle front from both ends in the vehicle width direction of the dash lower panel 3. This front side frame 6 is located on the inner side in the vehicle width direction and on the lower side in the vehicle vertical direction of the apron reinforcement 5 described above.

In addition, each of the front side frames 6 described above is the vehicle body strengthening member that joins and fixes a front side frame inner and a front side frame outer to each other and has a front side frame closed cross-section extending in the vehicle front-rear direction.

As illustrated in FIGS. 1 to 3, there is provided suspension tower portions 7 that project upward while being fixed to the front side frames 6 described above and support the upper portions of the dampers of front suspension devices. As illustrated in FIG. 2, each of the suspension tower portions 7 is mounted across a front side panel 8a constituting the inner side surface of the apron reinforcement 5 and the front side frame 6 described above. Here, strut tower portions may be adopted as the suspension tower portions 7 described above.

Rear side panels 8b are provided so as to be continuous with the front side panels 8a described above in the vehicle front-rear direction (see FIG. 2).

There are provided coupling members that couple the front end portions of the front side frames 6 described above and the front portions of the apron reinforcements 5 to each other in the vehicle vertical direction.

On the other hand, the left and right side portions in the vehicle width direction of the engine compartment 1 described above are covered with front fender panels. In addition, a bonnet covers the engine compartment 1 described above from above in an openable and closable manner.

Here, the front fender panel described above is fixed to the apron reinforcement 5 with a plurality of mounting members. In addition, the bonnet described above includes a bonnet outer panel and a bonnet inner panel and the bonnet outer panel is integrated with the bonnet inner panel by hemming the peripheral portion of the bonnet outer panel.

As illustrated in FIG. 4, an upper end bent portion is integrally formed at the upper end of the dash lower panel 3 described above, and an air inlet 3a that takes in air for air conditioning is opened and formed on one end side (the right end side in the vehicle width direction in this example) in the vehicle width direction.

An upper end bent portion of the dash lower panel 3 described above is provided with the cowl panel having a substantially hat-shaped cross-section via a dash upper panel. A cowl closed cross section extending in the vehicle width direction is formed between the cowl panel and the dash upper panel described above to improve the rigidity of the cowl portion.

The front windshield 4 described above is attached to an upper wall portion, which is inclined in a front-low-back-high manner, of the cowl panel described above via an adhesive.

As illustrated in FIG. 1, there is provided a cowl grille 9 divided into left and right halves located on the vehicle front side of the dash lower panel 3 below (diagonally below the front windshield 4 in the non-limiting embodiment) the front windshield 4.

As illustrated in FIG. 1, this cowl grille 9 extends across substantially the entire width in the vehicle width direction. In addition, as illustrated in FIGS. 6 and 7, this cowl grille 9 has front and rear upper surface portions 9a and 9b, front and rear vertical wall portions 9c and 9d, and a cowl seal mounting portion 9e to which a cowl seal is mounted.

Furthermore, as illustrated in FIG. 1, in the upper surface portion 9b behind the cowl grille 9 described above, outside air introduction holes 10 with a mesh structure are opened and formed in the portion shifted to the right side in the vehicle width direction from the middle portion in the vehicle width direction.

The outside air introduction holes 10 described above are formed at positions away from the air inlet 3a of the dash lower panel 3 illustrated in FIG. 4 to the inner side in the vehicle width direction as the other end side in the vehicle width direction.

As illustrated in FIGS. 1 and 2, a wheel house panel 11 is located in the lower front on the left side in the vehicle width direction of the cowl grille 9. A reservoir tank as one of auxiliaries and a fuse box storage case for storing the fuse box as one of the auxiliaries are disposed on this wheel house panel 11, and a cover member 12 (see FIG. 1) that covers these auxiliaries from above is provided above the auxiliaries.

In addition, as illustrated in FIGS. 1 and 2, a wheel house panel 13 is located in the lower front on the right side in the vehicle width direction of the cowl grille 9. A battery as one of the auxiliaries and a fuse box storage case for storing the fuse box as one of the auxiliaries are disposed on this wheel house panel 13, and a cover member 14 (see FIG. 1) that covers the auxiliaries from above is provided above these auxiliaries.

As illustrated in FIG. 6, there is provided a drain member 40 that forms, together with the cowl grille 9, a closed cross-section 15 extending in the vehicle width direction below the cowl grille 9. As illustrated in FIGS. 6 and 7, this drain member 40 has a drain path 41 for drainage to the outer side in the vehicle width direction below the front windshield 4.

As illustrated in FIG. 2, below the front windshield 4, cowl centers 20 and 21 as left and right gutter members are provided at intervals in the middle portion in the vehicle width direction. These cowl centers 20 and 21 are the rain gutter members that receive the water dripping from the front windshield 4.

Both the left and right cowl centers 20 and 21 are provided within the closed cross-section 15 described above between the cowl grille 9 and the drain member 40 (see FIG. 6).

FIGS. 3 to 7 illustrate only the cowl center 21 on the vehicle right side, but the left and right cowl centers 20 and 21 are provided so as to extend from the front wall portion of the cowl panel toward the vehicle front. The cowl center 20 on the vehicle left side is provided immediately behind a wiper motor (electrical component).

In FIGS. 6 and 7, reference numeral 16 indicates a cowl rain upper extending from the dash upper panel to the vehicle front and reference numeral 17 indicates a cowl rain lower extending from the upper portion of the dash lower panel 3 to the vehicle front.

In addition, in FIGS. 6 and 7, reference numeral 22 indicates a first insulator that covers the front portion of the cowl rain lower 17 to the front portion of the dash lower panel 3 and reference numeral 23 indicates a second insulator that covers at least the front portion of the drain member 40 from below.

Furthermore, reference numerals 24 and 25 in FIGS. 2, 3, and 4 indicate partition walls and these left and right partition walls 24 and 25 separate the hot zones on the vehicle front side of the partition walls 24 and 25 from the cool zones on the vehicle rear side of the partition walls 24 and 25.

These partition walls 24 and 25 include a partition portion 25a extending in the vertical direction and upper wall portions 24b and 25b formed integrally at the upper end of the partition portion 25a, and the end portions on the inner side in the vehicle width direction of the upper wall portions 24b and 25b are coupled and fixed to the end portions in the vehicle width direction of the drain member 40 using mounting members 26. The end portions on the outer side in the vehicle width direction of the upper wall portions 24b and 25b are coupled and fixed to the upper surface portion of the apron reinforcement front 5F using mounting members 27.

As illustrated in FIGS. 6 and 7, the cowl center 21 on the vehicle right side is located above the drain member 40 and below the front windshield 4.

The cowl center 21 described above is configured as illustrated in FIGS. 4 and 5.

That is, the cowl center 21 includes a bottom wall 21a extending in the vehicle width direction, a front wall 21b rising upward from the front portion of the bottom wall 21a, a rear wall 21c extending from the rear portion of the bottom wall 21a to the upper rear, an inner side wall 21d rising upward from the front side portion of the inner end in the vehicle width direction of the bottom wall 21a, and an outer side wall 21e rising upward from the outer end in the vehicle width direction of the bottom wall 21a.

In addition, the cowl center 21 described above has a flow path portion 28 that receives the water dripping from the front windshield 4 and flows the received water in the vehicle width direction. As illustrated by the dotted rectangle in FIG. 5, this flow path portion 28 is formed across the entire width in the vehicle width direction of the cowl center 21 on the front side of the bottom wall 21a and immediately behind the front wall 21b.

The cowl center 21 has a drain portion 29 that drains water to the drain member 40 on the inner side in the vehicle width direction of the flow path portion 28 described above. In addition, the cowl center 21 has a drain portion 30 that drains water downward on the outer side in the vehicle width direction of the flow path portion 28 described above.

As illustrated in FIGS. 4 and 5, the drain portions 29 and 30 described above are provided at positions away in the vehicle width direction from the air inlet 3a of the dash lower panel 3.

In short, the front structure of a vehicle described above includes the drain member 40 having the drain path 41 for drainage to the outer side in the vehicle width direction below the front windshield 4 and the cowl center 21 as a gutter member located above the drain member 40 and below the front windshield 4, in which the cowl center 21 has the flow path portion 28 that receives the water dripping from the front windshield 4 and flows the received water in the vehicle width direction and the drain portion 29 that drains the water to the drain member 40 on the inner side in the vehicle width direction of the flow path portion 28.

Furthermore, as illustrated in FIGS. 6 and 7, the flow path portion 28 described above is provided so that at least a part thereof overlaps with the drain path 41 of the drain member 40 in vehicle plan view.

In addition, the cowl center 21 has a plurality of guide portions 31, 32, and 33 that guide the water dripping from the drain portion 29 to the drain path 41 described above (FIGS. 4, 6, and 7).

These guide portions 31, 32, and 33 include a cushioning material that absorbs an impact load at least in the vehicle vertical direction, and a foam resin material is used as the cushioning material.

As described above, entry of water to other than the drain path 41 is suppressed by providing the guide portions 31, 32, and 33. In addition, by making the guide portions 31, 32, and 33 from the cushioning material, even if the cushioning material comes into contact with the drain member 40 when the vehicle collides with a pedestrian, the collision load to be input to the collision object can be reduced by absorbing the collision load.

In short, this structure suppresses entry of water to a portion other than the drain path 41 of the drain member 40 while suppressing a strut behavior between the drain member 40 and the cowl center 21 at the time of vehicle collision.

In contrast, the drain member 40 described above extends in the vehicle width direction as illustrated in FIGS. 2 and 4 and this drain member 40 has a top deck portion 42 located thereon at a position overlapping with the outside air introduction hole 10 (see FIG. 1) in vehicle plan view.

Inclined portions 43 and 44 inclined downward toward the outer side in the vehicle width direction are formed on both sides in the longitudinal direction of the drain member 40 described above, that is, on the left and right sides of the top deck portion 42 of the drain member 40.

As illustrated in FIG. 3, the drain portion 29 described above of the cowl center 21 on the vehicle right side is provided at substantially the same position in the vehicle width direction as the top deck portion 42 of the drain member 40.

This reduces the distance in the vertical direction between the drain portion 29 of the cowl center 21 and the top deck portion 42 of the drain member 40 and water is drained from the drain portion 29 of the cowl center 21 to the top deck portion 42 of the drain member 40 with a smaller distance in the vertical direction so that droplets are not easily generated.

In addition, as illustrated in FIG. 6, the drain member 40 described above has a length in the vehicle front-rear direction from the lower end of the inclination of the front windshield 4 to the position located further ahead of a mounting flange portion 9f at the lower end of the vertical wall portion 9c of the cowl grille 9 at a position (position of cross-section taken along line A-A in FIG. 2) facing the drain portion 29 in the vertical direction.

As illustrated in FIGS. 6 and 7, the top deck portion 42 of the drain member 40 described above has the vertical wall portion 45 that constitutes the front end portion of the drain path 41 and extends in the vertical direction, and this vertical wall portion 45 overlaps with the flow path portion 28 described above in vehicle plan view.

As illustrated in FIGS. 3 and 4, the vertical wall portion 45 described above is formed across the entire width in the vehicle width direction of the top deck portion 42 in the front end portion of the drain path 41.

Accordingly, the appropriate drain path 41 can be formed by the vertical wall portion 45 and this vertical wall portion 45 extends in the vertical direction and comes close to the flow path portion 28. However, since the guide portions 31, 32, and 33 include the cushioning material, even if the vertical wall portion 45 comes into contact with the flow path portion 28 via the guide portions 31, 32, and 33 at the time of collision, the collision load to be input to the collision object can be reduced by absorbing the collision load.

As illustrated in FIG. 6, the flow path portion 28 described above has a front wall 28a and a rear wall 28b and is formed to have a substantially U-shaped cross-section in vehicle side view. The front wall 28a of the flow path portion 28 is continuous with the front wall 21b of the cowl center 21. The rear wall 28b of the flow path portion 28 is continuous with the bottom wall 21a of the cowl center 21 as illustrated in FIG. 5.

As illustrated in FIG. 6, a hole 29A as the drain portion 29 described above is opened and formed behind the flow path portion 28 described above, that is, in the rear wall 28b of the flow path portion 28.

The guide portions 31, 32, and 33 include the hole side guide portion 31 provided so as to be inclined downward toward the vehicle rear from the lower end of the hole 29A.

Since the hole side guide portion 31 is provided as described above, an impact load in the vertical direction can be absorbed because the hole side guide portion 31 includes the cushioning material while drainage from the hole 29A to the drain path 41 is ensured.

Here, the lower end portion of the hole side guide portion 31 overlaps with the drain path 41 in vehicle plan view (see FIG. 6).

Since the lower end portion of the hole side guide portion 31 overlaps with the drain path 41 as described above, the water once contained in the hole side guide portion 31 or the water dripping while being attached to the hole side guide portion 31 reliably drips from the lower end portion of the hole side guide portion 31 to the drain path 41, thereby further reliably suppressing entry of water to a portion other than the drain rote 41 more reliably.

As illustrated in FIGS. 4 and 7, the guide portions 31, 32, and 33 described above include the air inlet side guide portions 32 and 33 provided along the substantially U-shaped cross-section at a position, located below the flow path portion 28, that is closer to the air inlet 3a of the dash lower panel 3 in the vehicle width direction than the hole 29A.

The two air inlet side guide portions 32 and 33 are provided at intervals in the vehicle width direction in the non-limiting embodiment as illustrated in FIG. 4, but one air inlet side guide portion 32 and 33 may be provided singly or three or more air inlet side guide portions 32 and 33 may be provided.

When the water drops having dripped from the hole 29A (see FIG. 6) are sucked by wind from the air inlet 3a and flow in the vehicle width direction while containing droplets, the wind containing droplets strikes the wall surfaces in the vehicle width direction of the air inlet side guide portions 32 and 33 and accurately drips onto the drain path 41 along the air inlet side guide portions 32 and 33. As described above, the droplets sucked from the hole 29A to the air inlet 3a are guided to the drain path 41 by the air inlet side guide portions 32 and 33 in this structure.

The guide portions 31, 32, and 33 include the cushioning material such as a foam resin material to absorb the impact load in the vertical direction, thereby making the structure of the cushioning material simple.

In the drawing, arrow F indicates the vehicle front side, arrow R indicates the vehicle rear side, arrow IN indicates the inner side in the vehicle width direction, arrow OUT indicates the outer side in the vehicle width direction, and arrow UP indicates the vehicle upper side.

As described above, the front structure of a vehicle according to the present disclosure includes the drain member 40 having the drain path 41 for drainage to the outer side in the vehicle width direction below the front windshield 4 and the gutter member (cowl center 21) located above the drain member 40 and below the front windshield 4, in which the gutter member (cowl center 21) has the flow path portion 28 that receives the water dripping from the front windshield 4 and flows the received water in the vehicle width direction and the drain portion 29 that drains the water to the drain member 40 on the inner side in the vehicle width direction of the flow path portion 28, at least a part of the flow path portion 28 overlaps with the drain path 41 in vehicle plan view, the gutter member (cowl center 21) has the guide portions 31, 32, and 33 that guide the water dripping from the drain portion 29 to the drain path 41, and the guide portions 31, 32, and 33 include a cushioning material that absorbs an impact load at least in a vertical direction (see FIGS. 6 and 7).

In the front structure of a vehicle as described above, entry of water to a portion other than the drain path 41 can be suppressed by providing the guide portions 31, 32, and 33 and, even if the cushioning material comes into contact with the drain member 40 when the vehicle collides with a pedestrian, the collision load to be input to the collision object can be reduced by absorbing the collision load because the guide portions 31, 32, and 33 includes the cushioning material.

In short, it is possible to suppress entry of water to a portion other than the drain path 41 of the drain member 40 while suppressing a strut behavior between the drain member 40 and the gutter member (cowl center 21) at the time of vehicle collision.

In addition, in the front structure of a vehicle, the flow path portion 28 has a cross-section with a substantially U-shape in vehicle side view and has the hole 29A as the drain portion 29 behind the flow path portion 28, and the guide portions 31, 32, and 33 include the hole side guide portion 31 that is inclined downward toward the vehicle rear from the lower end of the hole 29A (see FIG. 6).

In the front structure of a vehicle as described above, since the hole side guide portion 31 is provided, an impact load in the vertical direction can be absorbed because the hole side guide portion 31 includes the cushioning material while drainage from the hole 29A to the drain path 41 is ensured.

In addition, in the front structure of a vehicle, the lower end portion of the hole side guide portion 31 overlaps with the drain path 41 in vehicle plan view (see FIG. 6).

In the front structure of a vehicle as described above, since the lower end portion of the hole side guide portion 31 overlaps with the drain path 41, the water once contained in the hole side guide portion 31 or the water dripping while being attached to the hole side guide portion 31 reliably drips from the lower end portion of the hole side guide portion 31 to the drain path 41, thereby suppressing entry of water to a portion other than the drain path 41 more reliably.

In addition, in the front structure of a vehicle, the air inlet 3a that takes in air for air conditioning is opened and formed on one end side in the vehicle width direction of a dash panel (dash lower panel 3), and the guide portions 31, 32, and 33 include the air inlet side guide portions 32 and 33 provided along the substantially U-shaped cross-section at a position, located below the flow path portion 28, that is closer to the air inlet 3a in the vehicle width direction than the hole 29A (see FIGS. 4 and 7).

In the front structure of a vehicle as described above, when the water drops having dripped from the hole 29A are sucked by wind from the air inlet 3a and flow in the vehicle width direction while containing droplets, the wind containing droplets strikes the wall surfaces in the vehicle width direction of the air inlet side guide portions 32 and 33 and accurately drips onto the drain path 41 along the air inlet side guide portions 32 and 33. As described above, the droplets sucked from hole 29A to the air inlet 3a can be guided to the drain path 41.

In addition, in the front structure of a vehicle, the cushioning material includes a foam resin material (see FIGS. 6 and 7).

According to the front structure of a vehicle as described above, the cushioning material with a simple structure can be formed.

In addition, the front structure of a vehicle further includes the vertical wall portion 45 that constitutes the front end portion or the rear end portion of the drain path 41 and extends in the vertical direction, in which the vertical wall portion 45 overlaps with the flow path portion 28 in vehicle plan view (see FIGS. 6 and 7).

In the front structure of a vehicle as described above, the appropriate drain path 41 can be formed by the vertical wall portion 45 and this vertical wall portion 45 extends in the vertical direction and comes close to the flow path portion 28. However, since the guide portions 31, 32, and 33 include the cushioning material, even if the vertical wall portion 45 comes into contact with the flow path portion 28 via the guide portions 31, 32, and 33 at the time of collision, the collision load to be input to the collision object can be reduced by absorbing the collision load.

In the correspondence between the structure of the present disclosure and the non-limiting embodiment described above, the dash panel according to the present disclosure corresponds to the dash lower panel 3 according to the non-limiting embodiment, similarly, the gutter member corresponds to the cowl center 21, and the guide portion corresponds to the hole side guide portions 31 and the air inlet side guide portions 32 and 33, but the present disclosure is not limited to only the structure of the embodiment described above.

INDUSTRIAL APPLICABILITY

As described above, the present disclosure is useful for the front structure of a vehicle that includes the drain member having the drain path for drainage to the outer side in the vehicle width direction below the front windshield and the gutter member located above the drain member and below the front windshield.

Description of Reference Signs and Numerals

3: dash lower panel (dash panel)
3a: air inlet
4: front windshield
21: cowl center (gutter member)
28: flow path portion
29: drain portion
29A: hole
31: hole side guide portion (guide portion)
32, 33: air inlet side guide portion (guide portion)
40: drain member
41: drain path
45: vertical wall portion

The invention claimed is:

1. A front structure of a vehicle, comprising:
a drain having a drain path for drainage to an outer side in a vehicle width direction below a front windshield; and
a gutter located above the drain and below the front windshield,
wherein the gutter has a flow path portion that receives water dripping from the front windshield and flows the received water in the vehicle width direction and a drain portion that drains the water to the drain on an inner side in the vehicle width direction of the flow path portion, at least a part of the flow path portion overlapping with the drain path in vehicle plan view, and
the gutter has a guide portion that guides the water dripping from the drain portion to the drain path and the guide portion includes a cushioning material that absorbs an impact load at least in a vertical direction.

2. The front structure of the vehicle according to claim 1,
wherein the flow path portion has a cross-section with a substantially U-shape in vehicle side view and has a hole as the drain portion behind the flow path portion, and the guide portion has a hole side guide portion that is inclined downward toward a vehicle rear from a lower end of the hole.

3. The front structure of the vehicle according to claim 2,
wherein a lower end portion of the hole side guide portion overlaps with the drain path in vehicle plan view.

4. The front structure of the vehicle according to claim 3,
wherein an air inlet that takes in air for air conditioning is opened and formed on one end side in the vehicle width direction of a dash panel, and the guide portion includes an air inlet side guide portion provided along the substantially U-shaped cross-section at a position below the flow path portion, the position being closer to the air inlet in the vehicle width direction than the hole.

5. The front structure of the vehicle according to claim 4,
wherein the cushioning material includes a foam resin material.

6. The front structure of the vehicle according to claim 5, further comprising:
a vertical wall portion that constitutes a front end portion or a rear end portion of the drain path and extends in the vertical direction,
wherein the vertical wall portion overlaps with the flow path portion in vehicle plan view.

7. The front structure of the vehicle according to claim 2,
wherein an air inlet that takes in air for air conditioning is opened and formed on one end side in the vehicle width direction of a dash panel, and the guide portion includes an air inlet side guide portion provided along the substantially U-shaped cross-section at a position below the flow path portion, the position being closer to the air inlet in the vehicle width direction than the hole.

8. The front structure of the vehicle according to claim 1,
wherein the cushioning material includes a foam resin material.

9. The front structure of the vehicle according to claim 1, further comprising:
   a vertical wall portion that constitutes a front end portion or a rear end portion of the drain path and extends in the vertical direction,
   wherein the vertical wall portion overlaps with the flow path portion in vehicle plan view.

\* \* \* \* \*